United States Patent
Kuriyama et al.

(10) Patent No.: US 8,033,009 B2
(45) Date of Patent: Oct. 11, 2011

(54) METHOD FOR PRODUCING A FORCE SENSOR

(75) Inventors: Nariaki Kuriyama, Saitama (JP); Jun Sasahara, Saitama (JP); Tadahiro Kubota, Saitama (JP); Daisuke Okamura, Saitama (JP); Takeshi Ohsato, Saitama (JP)

(73) Assignee: Honda Motor Co., Ltd, Tokyo (JP)

( * ) Notice: Subject to any disclaimer, the term of this patent is extended or adjusted under 35 U.S.C. 154(b) by 242 days.

(21) Appl. No.: 11/892,493

(22) Filed: Aug. 23, 2007

(65) Prior Publication Data

US 2008/0047366 A1 Feb. 28, 2008

(30) Foreign Application Priority Data

Aug. 24, 2006 (JP) ................................ 2006-227466

(51) Int. Cl.
*H01C 17/28* (2006.01)

(52) U.S. Cl. ............. 29/621.1; 29/825; 29/829; 29/846; 73/720; 73/726; 73/862.627

(58) Field of Classification Search ................. 29/621.1, 29/825, 829, 846; 73/627, 720, 726, 777, 73/862.68, 862.541, 862.627
See application file for complete search history.

(56) References Cited

U.S. PATENT DOCUMENTS

| | | | |
|---|---|---|---|
| 4,454,771 A * | 6/1984 | Shimazoe et al. | 73/862.68 |
| 5,459,351 A * | 10/1995 | Bender | 257/417 |
| 2006/0086190 A1 | 4/2006 | Ohsato et al. | |
| 2007/0006668 A1 | 1/2007 | Hirabayashi et al. | |

FOREIGN PATENT DOCUMENTS

| | | |
|---|---|---|
| JP | 04/249727 | 9/1992 |
| JP | 06/296033 | 10/1994 |
| JP | 11-38038 | 2/1999 |
| JP | 2002/050771 | 2/2002 |
| JP | 2003-207405 | 7/2003 |
| JP | 2003-254843 | 9/2003 |
| JP | 2006-125873 | 5/2006 |
| JP | 2007-10379 | 1/2007 |

\* cited by examiner

*Primary Examiner* — Thiem Phan

(74) *Attorney, Agent, or Firm* — Squire, Sanders & Dempsey (US) LLP

(57) ABSTRACT

There is provided a method for producing a force sensor including: a force sensor chip; and an attenuator, in which the force sensor chip and the attenuator are joined at joint portions with a glass layer sandwiched therebetween. The method includes: a film forming step in which a glass film as the glass layer is formed on regions of the attenuator containing the joint portions or on regions of the force sensor chip containing the joint portions; and an anodic bonding step in which the force sensor chip and the attenuator are stacked as a stacked body in close contact with each other at the joint portions, and the glass film and the force sensor chip, or the glass film and the attenuator, are joined.

5 Claims, 13 Drawing Sheets

Fx application

Fz application

My application

Mz application

US 8,033,009 B2

METHOD FOR PRODUCING A FORCE SENSOR

CROSS-REFERENCE TO RELATED APPLICATIONS

This application claims the foreign priority benefit under Title 35, United States Code, section 119 (a)-(d), of Japanese Patent Application No. 2006-227466, filed on Aug. 24, 2006 in the Japan Patent Office, the disclosure of which is herein incorporated by reference in its entirety.

BACKGROUND OF THE INVENTION

1. Field of the Invention

The present invention relates to a force sensor and a method for producing the force sensor, and particularly to a force sensor in which a force sensor chip and an attenuator are joined by anodic bonding through a glass layer sandwiched therebetween, and a method for producing the force sensor.

2. Description of the Related Art

Conventionally, in an industrial robot and the like, there has been adopted a multi-axis force sensor for accurately measuring a size and direction of an external force applied to the robot during an action of the robot, in order to implement a control under which the robot appropriately and flexibly responds to the external force.

As the multi-axis force sensor, for example, there has been known a force sensor utilizing a property of a strain resistive element (piezo resistive element), in which a resistance value changes in accordance with minute strain (compression, tension) caused by an applied external force (See, for example, Japanese unexamined patent publication Nos. 2003-207405 and 2003-254843, the disclosures of which are herein incorporated by reference in their entireties).

The multi-axis force sensor has a force sensor chip formed on a semiconductor substrate by a semiconductor production process, and an attenuator made of a metal member for accommodating and securing the force sensor chip.

Specifically, in the force sensor chip, the strain resistive elements are appropriately arranged around an action portion to which an applied external force is transmitted, and a change in a resistance value of the strain resistive element due to the external force is detected as an electrical signal, which presents a size and direction of the external force. If the applied external force is directly transmitted to the strain resistive element, and the external force is excessively large, the force sensor chip may be damaged. In order to receive the external force of various magnitudes without causing damage, the attenuator is introduced for attenuating the applied external force to an appropriate magnitude to transmit to the force sensor chip.

The force sensor chip is fixed to the attenuator through the joint portion, in order to accurately transmit the applied external force to the force sensor chip. If the force sensor chip formed on the semiconductor substrate is directly joined to the attenuator made of a metal member, there arise problems, such as electric hazard including leakage, detachment of two members at the joint portion due to a difference in coefficient of thermal expansion between two members, and thermal strain, all of which may deteriorate the detection accuracy.

In order to overcome the problems, some conventional techniques introduce a bulky (massive) glass plate, which has approximately the same thickness as that of the semiconductor substrate, as an interface between the force sensor chip and the attenuator, from a viewpoint of insulation property and coefficient of thermal expansion. For joining the glass plate to the force sensor chip and to the attenuator, an epoxy resin adhesive is applied to the joint faces thereof, or the joint faces are chemically bonded by anodic bonding. In anodic bonding, while the entire subject is heated, a voltage is applied to the subject with a negative voltage on a glass plate side and a positive voltage on a side of an object to be joined, in order to transfer alkali ion, such as $Na^+$, from the glass to the object. Typical thickness of the glass plate to be joined to the object is approximately 0.1 to several mm.

The conventional anodic bonding method will be specifically described with reference to FIGS. 13A and 13B. FIGS. 13A and 13B illustrate steps of anodic bonding at joint portions of a force sensor chip and an attenuator with the presence of a glass plate therebetween, in which FIG. 13A shows joining of the glass plate and the attenuator, and FIG. 13B shows joining of the attenuator with the glass plate joined thereto and the force sensor chip.

In the anodic bonding, as described above, a voltage is applied to the subject with a negative voltage on the glass plate, and a positive voltage on an object to be joined.

Accordingly, when the attenuator and the glass plate are joined first by anodic bonding, as shown in FIG. 13A, a voltage is applied to the subject with a negative voltage on the glass plate 100 and a positive voltage on the attenuator 300. Then, when a complex of the attenuator 300 with the glass plate 100 joined thereto and the force sensor chip 200 are joined by anodic bonding, as shown in FIG. 13B, a voltage is applied with a negative voltage on an attenuator 300 side and thus on a glass plate 100 side of the joint portion 120, and a positive voltage on the force sensor chip 200.

It should be noted that, in this explanation of the conventional anodic bonding, the attenuator 300 and the glass plate 100 are joined first, and then the glass plate 100 and the force sensor chip 200 are joined; however, there may be a case in which the force sensor chip 200 and the glass plate 100 are joined first and then the glass plate 100 and the attenuator 300 are joined.

However, when an epoxy resin adhesive is used at joint faces of the glass plate and the force sensor chip or the attenuator, adhesion may become poor due to aged deterioration of the adhesive. In addition, a joint portion between the force sensor chip and the glass plate may be deformed or adhesive strength may become smaller, due to repeated compression and tension caused by external force on the attenuator. Due to this deterioration of the adhesive and deformation of joint portion, there arises a problem that minute change in external force cannot be accurately transmitted.

Further in anodic bonding, directions of voltage applied to the joint portion 110 are reversed between a case of joining of the attenuator 300 with the glass plate 100 (FIG. 13A), and a case of joining of the glass plate 100 with the force sensor chip 200 (FIG. 13B). As a result, fracture in the joint interface may occur from alkali ion (e.g., $Na^+$) in the glass plate 100, leading to problems, such as reduced joint strength and detachment of the joint face.

These problems also occur in a case where the force sensor chip 200 is joined with the glass plate 100 first and then the glass plate 100 is joined with the attenuator 300.

In the conventional anodic bonding, a bulky glass plate having a thickness that is about the same as that of the force sensor chip is used. Therefore, deflection of the glass plate caused by an external force cannot be neglected. Because the deflection of the glass plate should be taken into account, design flexibility of the force sensor tends to be limited.

Further, when a machine processing, such as carving, is performed on the bulky glass plate in order to make a specific shape, microcracks (minute cracks that cannot be observed)

will be generated. Since microcracks reduce a load-carrying capacity of the glass plate, there remains a problem of poor endurance and poor reliability.

Therefore, first, it would be desirable to provide a force sensor in which the joint portion is prevented from deteriorating during anodic bonding of a force sensor chip and an attenuator with a glass layer sandwiched therebetween, and a method for producing the same.

Second, it would be desirable to provide a force sensor in which the above-mentioned defects can be suppressed which may otherwise be generated by anodic bonding using a bulky glass plate, and a method for producing the same.

SUMMARY OF THE INVENTION

In one aspect of the present invention, there is provided a method for producing a force sensor including: a force sensor chip with strain resistive elements for detecting a transmitted external force; and an attenuator for fixing the force sensor chip, attenuating the external force and transmitting the attenuated external force to the force sensor chip, in which the force sensor chip and the attenuator are joined at joint portions with a glass layer sandwiched therebetween, the method including: a film forming step in which a glass film as the glass layer is formed on regions of the attenuator containing the joint portions or on regions of the force sensor chip containing the joint portions; and an anodic bonding step in which the force sensor chip and the attenuator are stacked as a stacked body in close contact with each other at the joint portions, and the glass film and the force sensor chip, or the glass film and the attenuator, are joined.

In another aspect of the present invention, there is provided a method for producing a force sensor including: a force sensor chip with strain resistive elements for detecting a transmitted external force; and an attenuator for fixing the force sensor chip, attenuating the external force and transmitting the attenuated external force to the force sensor chip, in which the force sensor chip and the attenuator are joined at joint portions with a glass layer sandwiched therebetween, the method including: a film forming step in which a glass film as the glass layer is formed on regions of the attenuator containing the joint portions; and an anodic bonding step in which the force sensor chip and the attenuator are stacked as a stacked body in close contact with each other at the joint portions, and a voltage is applied to the stacked body with a positive voltage on a force sensor chip side and a negative voltage on an attenuator side, to join the glass film and the force sensor chip.

In still another aspect of the present invention, there is provided a method for producing a force sensor including: a force sensor chip with strain resistive elements for detecting a transmitted external force; and an attenuator for fixing the force sensor chip, attenuating the external force and transmitting the attenuated external force to the force sensor chip, in which the force sensor chip and the attenuator are joined at joint portions with a glass layer sandwiched therebetween, the method including: a film forming step in which a glass film as the glass layer is formed on regions of the force sensor chip containing the joint portions; and an anodic bonding step in which the force sensor chip and the attenuator are stacked as a stacked body in close contact with each other at the joint portions, and a voltage is applied to the stacked body with a negative voltage on a force sensor chip side and a positive voltage on an attenuator side, to join the glass film and the attenuator.

According to the above, in a region containing the joint portion of the attenuator or the force sensor, a glass film as a glass layer is formed, and by utilizing this glass film, the force sensor chip and the attenuator are joined by anodic bonding. Therefore, even when a potential difference is generated in the film formation interface of the glass film by anodic bonding, joint strength can be retained without causing fracture in the glass film formed in the initial step, or lowing the joint strength.

Herein, an expression "formation of glass film" or similar expressions indicates a technique of forming a thin film (coating film) on an object, by casting a material for forming a layer in a form of a gas of atoms or molecules, in vacuum at high speed on the object, and the thickness of the film is intended herein to be approximately 0.05-20 μm.

In addition, by forming a glass film, the glass layer can be made much thinner than the bulky glass plate. Therefore, deflection of the glass layer due to external force can be reduced to a minimum, and an effect of the deflection of the glass layer can be skipped, leading to improvement in design flexibility of the force sensor.

Moreover, since there is no need to prepare a bulky glass and to perform machine processing, such as carving processing, the number of parts can be reduced which in turn reduces the cost, and microcracks can be prevented, which improves load-carrying capacity and reliability.

In other aspect of the present invention, there is provided a method for producing a force sensor including: a force sensor chip with strain resistive elements for detecting a transmitted external force; and an attenuator for fixing the force sensor chip, attenuating the external force and transmitting the attenuated external force to the force sensor chip, in which the force sensor chip and the attenuator are joined at joint portions with a glass layer sandwiched therebetween, the method including: a step of forming strain resistive elements, wirings, electrodes and through-holes at specific positions on a semiconductor substrate; a film forming step in which a glass film as the glass layer is formed on regions of the semiconductor substrate containing the joint portions; a step of separating the force sensor chip from the semiconductor substrate by dicing; and an anodic bonding step in which the force sensor chip and the attenuator are stacked as a stacked body in close contact with each other at the joint portions, and a voltage is applied to the stacked body with a negative voltage on a force sensor chip side and a positive voltage on an attenuator side, to join the glass film and the attenuator.

In the step of producing a force sensor chip, the strain resistive element and the like are formed at specific positions on the semiconductor substrate, the glass film is formed in a region containing the joint portion, and the force sensor chip is separated from the semiconductor substrate by dicing. Accordingly, it becomes possible to efficiently obtain the glass film.

In the methods described above, it is preferable that vapor-deposition or sputtering be used in the film forming step.

With the vapor-deposition technique or the sputtering technique, a glass film having a specific thickness can be formed at specific positions.

In the method described above, it is preferable that a thickness of the glass film formed in the film forming step be in a range of 0.05-20 μm.

By forming a glass film having a thickness of approximately 0.05-20 μm, a film thickness required for anodic bonding is secured, and by disposing such a glass film between the force sensor chip and the attenuator, problems can be prevented, such as electric hazard including leakage, and detachment at the joint portion due to a difference in coefficient of thermal expansion between the force sensor chip and the attenuator.

In the method described above, it is preferable that the force sensor chip include: an action portion to which the external force is transmitted, a connecting portion which is adjacent to the action portion and on which the strain resistive elements are disposed at specific positions, and a support portion for supporting the action portion and the connecting portion; the attenuator include: an input portion to which the external force is input, a fixing portion for fixing the force sensor chip, and a transmission portion for attenuating the external force and transmitting the attenuated external force to the action portion; and the joint portions be provided at positions between the action portion and the transmission portion, and between the support portion and the fixing portion.

According to this configuration, by joining the action portion and the transmission portion with the glass film sandwiched therebetween, and the support portion and the fixing portion with the glass film sandwiched therebetween, problems can be prevented, such as electric hazard including leakage, and detachment at the joint portion due to a difference in coefficient of thermal expansion between the force sensor chip and the attenuator. In addition, by joining the action portion and the transmission portion with the glass film sandwiched therebetween, an effect of the deflection of the glass layer can be reduced, realizing the force sensor with high design flexibility.

In other aspect of the present invention, there is provided a force sensor including: a force sensor chip with strain resistive elements for detecting a transmitted external force; and an attenuator for fixing the force sensor chip, attenuating the external force and transmitting the attenuated external force to the force sensor chip, in which the force sensor chip and the attenuator are joined at joint portions with a glass layer sandwiched therebetween, wherein the glass layer is a glass film.

According to the configuration above, by using a glass film as a glass layer, the glass layer can be made much thinner than the bulky glass plate. Therefore, deflection of the glass layer due to external force can be reduced to a minimum, and an effect of the deflection of the glass layer can be skipped. As a result, without paying any attention to deflection of the glass layer which may otherwise require intricate correction on an output of the force sensor chip, an accurate detection can be implemented with a simple data processing.

Moreover, since there is no need to prepare a bulky glass and to perform machine processing, such as carving processing, the number of parts can be reduced which in turn reduces the cost, and microcracks can be prevented, which improves load-carrying capacity and reliability.

In the force sensor described above, it is preferable that the glass film have a thickness of 0.05-20 μm.

According to this configuration, by forming a glass film having a thickness of approximately 0.05-20 μm, a film thickness required for anodic bonding is secured, and by disposing such a glass film between the force sensor chip and the attenuator, problems can be prevented, such as electric hazard including leakage, and detachment at the joint portion due to a difference in coefficient of thermal expansion between the force sensor chip and the attenuator.

The force sensor described above preferably includes: an action portion to which the external force is transmitted, a connecting portion which is adjacent to the action portion and on which the strain resistive elements are disposed at specific positions, and a support portion for supporting the action portion and the connecting portion; the attenuator includes: an input portion to which the external force is input, a fixing portion for fixing the force sensor chip, and a transmission portion for attenuating the external force and transmitting the attenuated external force to the action portion; and the joint portions are provided at positions between the action portion and the transmission portion, and between the support portion and the fixing portion.

According to this configuration, by disposing the glass film at the joint portion between the action portion and the transmission portion, and at the joint portion between the support portion and the fixing portion, problems can be prevented, such as electric hazard including leakage, and detachment at the joint portion due to a difference in coefficient of thermal expansion between the force sensor chip and the attenuator. In addition, by disposing the glass film at the joint portion between the action portion and the transmission portion, an effect of the deflection of the glass layer can be reduced, realizing the force sensor with high design flexibility.

BRIEF DESCRIPTION OF THE DRAWINGS

The various aspects, other advantages and further features of the present invention will become more apparent by describing in detail illustrative, non-limiting embodiments thereof with reference to the accompanying drawings.

FIGS. 1A and 1B illustrate a schematic framework of a force sensor according to an embodiment of the present invention, in which FIG. 1A is an external perspective view and FIG. 1B is a cross-sectional perspective view showing an inner structure.

FIGS. 4A and 4B illustrate a method for producing a force sensor according to an embodiment of the present invention, in which FIG. 4A is a schematic diagram showing formation of a glass film, and FIG. 4B is a cross-sectional view showing anodic bonding.

FIGS. 8A and 8B explain a deformed state of strain resistive elements when an external force Fx in an X-axis direction is transmitted to the action portion, in which FIG. 8A is a plan view, and FIG. 8B is a plan view showing a deformed state of the strain resistive elements.

FIGS. 9A and 9B explain a deformed state of strain resistive elements when an external force Fz in a Z-axis direction is transmitted to the action portion, in which FIG. 9A is a plan view, and FIG. 9B is a cross-sectional view showing a deformed state of the strain resistive elements.

FIGS. 10A and 10B explain a deformed state of strain resistive elements when a moment My about a Y-axis is applied, in which FIG. 10A is a plan view, and FIG. 10B is a cross-sectional view showing a deformed state of the strain resistive elements.

FIGS. 11A and 11B explain a deformed state of strain resistive elements when a moment Mz about the Z-axis is applied, in which FIG. 11A is a plan view, and FIG. 11B is a plan view showing a deformed state of the strain resistive elements.

FIGS. 13A and 13B illustrate steps of conventional anodic bonding, in which FIG. 13A shows joining of a glass plate and an attenuator, and FIG. 13B shows joining of the attenuator with the glass plate joined thereto and a force sensor chip.

DETAILED DESCRIPTION OF THE EXEMPLARY EMBODIMENTS

Figure 1A:
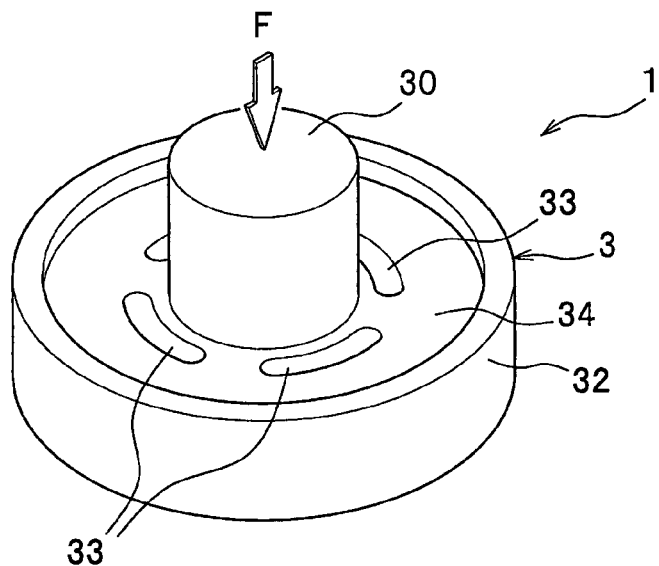

Embodiments of the present invention will be described in detail below with reference to the accompanying drawings.

It should be noted that in the drawings to be referred, for the purpose of convenience in explanation, an attenuator and the like are simplified, and configurations and positional relationships may be schematically and conceptually expressed. In addition, in the drawings, degree of strain, state of joint portion and the like may be exaggeratingly expressed.

A force sensor 1 according to the present invention is configured in a shape of a circular plate with an input portion 30 protruding therefrom (see FIG. 1A), and includes a force sensor chip 2 for detecting hexaxial components of a transmitted external force F (see FIG. 1B) and an attenuator 3 for fixing the force sensor chip 2, attenuating the external force F and transmitting the attenuated external force F to the force sensor chip 2.

Herein, for the force sensor 1 according to the present invention, a hexaxial force sensor that can detect a force and a moment of the external force F in terms of hexaxial components will be exemplified. Specifically, the force components with respect to directions of an X-axis, a Y-axis and a Z-axis orthogonal to each other are represented as Fx, Fy and Fz, respectively. The moment components with respect to the X-axis, the Y-axis and the Z-axis are represented as Mx, My and Mz, respectively.

It should be noted that, though the hexaxial force sensor is exemplified in the present embodiment, the present invention is not limited by the number of detection axes of the force sensor, size of an external force, or the like.

The force sensor chip 2 is in a shape of an approximate square as a plan view (also see FIG. 5), and includes: an action portion 21 to which the external force F is transmitted; a support portion 22 for supporting the action portion 21; a connecting portion 23 for connecting the action portion 21 and the support portion 22.

The attenuator 3 basically is in a shape of a flat circular plate, and includes the input portion 30 to which the external force F is input; a transmission portion 31 for attenuating the external force F input to the input portion 30 and transmitting the attenuated external force F to the action portion 21 of the force sensor chip 2; a fixing portion 32 for fixing the force sensor chip 2; and a disc portion 34 for connecting the fixing portion 32 and the input portion 30. In the disc portion 34, buffer holes 33 each in a shape of arcwise-curved oblong circle are formed.

In the present embodiment, as described above, the attenuator 3 is joined to the force sensor chip 2 at the fixing portion 32 for fixing the force sensor chip 2 and at the transmission portion 31 for transmitting the external force F, on the same side of the force sensor chip 2 (upper face side in the drawing). Due to this configuration, a whole body of the force sensor 1 can be made compact, assembling process can be simplified, and accuracy is enhanced.

Figure 2:
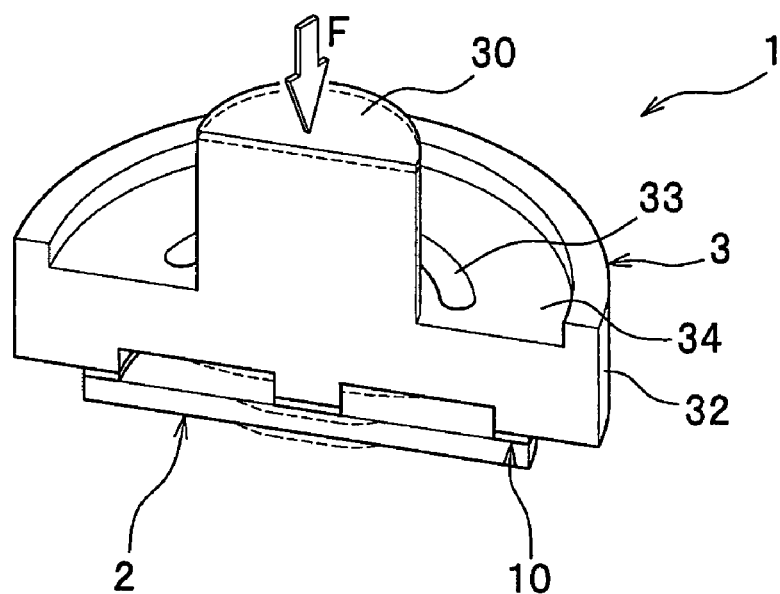
FIG. 2 is a cross-sectional perspective view diagrammatically showing a state in which an external force is attenuated and transmitted to a force sensor chip.
Figure 2:
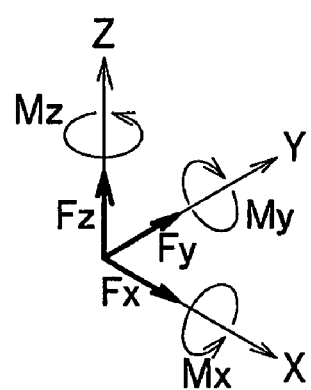

By providing the disc portion 34 that connects the fixing portion 32 and the input portion 30, the external force F applied to the input portion 30 is received mainly by the fixing portion 32, and then transmitted outward, as shown in FIG. 2. By providing the buffer holes 33 in the disc portion 34, the input portion 30 is deformed in a direction of the external force F, which attenuates the external force F and a part thereof is transmitted from the input portion 30 to the transmission portion 31.

In this manner, by properly adjusting the number and shape of the buffer holes 33 in the attenuator 3, even though the applied external force F exceeds a proof stress of the force sensor chip 2, an appropriately attenuated force is applied to the force sensor chip 2 and the external force F can be detected with high accuracy with steady balance.

The force sensor chip 2 and the attenuator 3 are joined by anodic bonding, through a glass film 10 sandwiched therebetween which is formed on the attenuator 3. Specifically, in the attenuator 3, on lower faces of the fixing portion 32 and the transmission portion 31, the glass film 10 is formed by vapor-deposition technique or sputtering technique, and the glass film 10 is joined by anodic bonding at joint portions 11, 12 on an upper face of the force sensor chip 2.

The joint portion 11 is a joint portion between the action portion 21 of the force sensor chip 2 and the transmission portion 31 of the attenuator 3, and the joint portion 12 is a joint portion between the support portion 22 of the force sensor chip 2 and the fixing portion 32 of the attenuator 3.

It should be noted that, in the present embodiment, though the glass film 10 on the attenuator 3 is formed on the entire lower faces of the transmission portion 31 and the fixing portion 32, the present invention is not limited by this configuration, and formation of the glass film 10 on at least the joint portions 11, 12, which are joined with the force sensor chip 2, will suffice.

Figure 3:
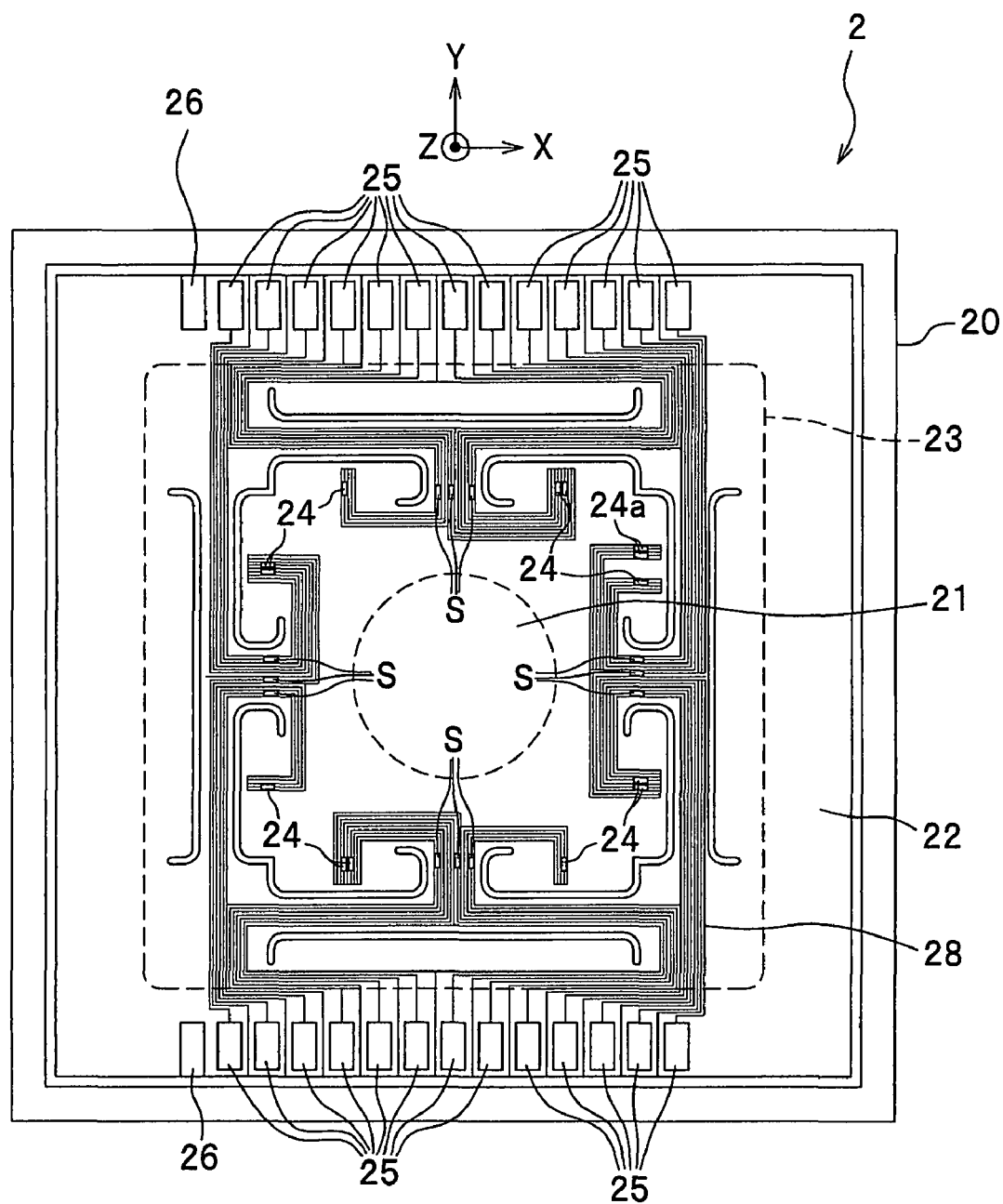
FIG. 3 is a plan view illustrating a schematic framework of a force sensor chip according to an embodiment of the present invention.

As shown in FIG. 3, in the force sensor chip 2, resistive elements, such as strain resistive elements S and temperature compensating resistive elements 24, are disposed at specific positions on the connecting portion 23 which is adjacent to the action portion 21 to which the external force F is transmitted (see FIG. 1A). Through wirings 28, the strain resistive elements S and the temperature compensating resistive elements 24 are connected to signal electrode pads 25 and GND electrode pads 26, which is for connecting with external devices (not shown) that measure resistance value.

Figure 4A:
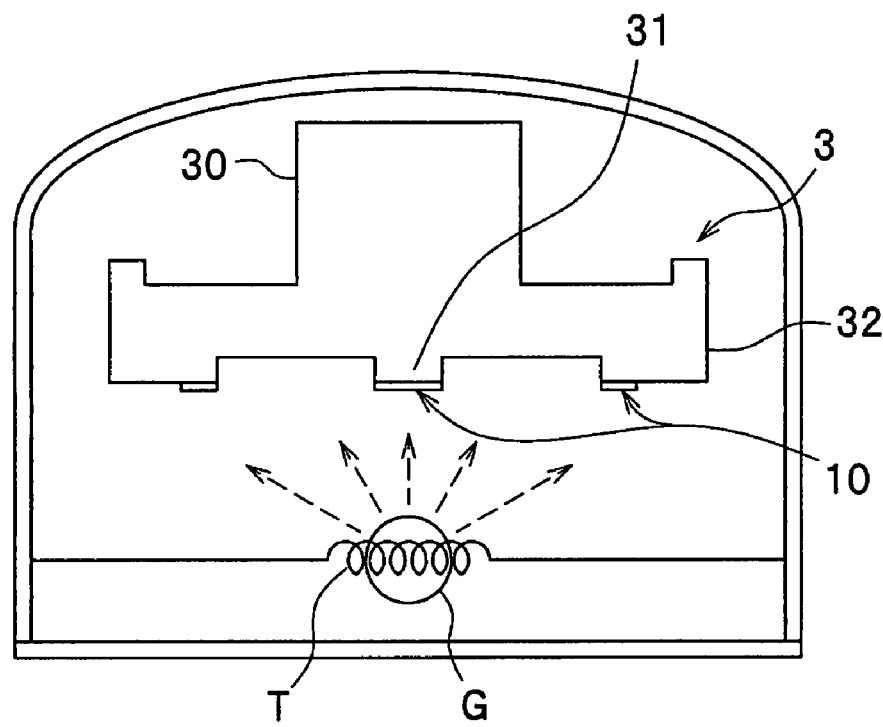
Figure 4B:
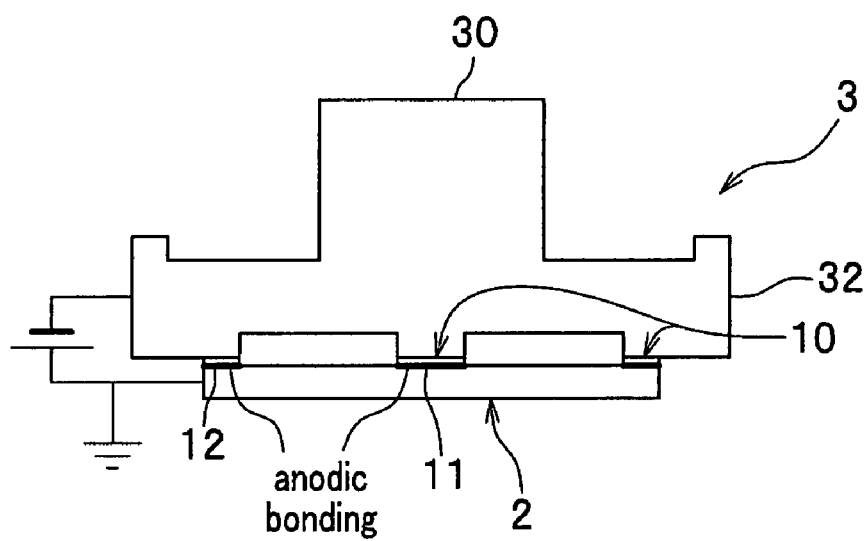

Next, a method for producing the force sensor 1 according to an embodiment of the present invention that has a configuration as described above will be described with reference mainly to FIGS. 4A and 4B. FIGS. 4A and 4B illustrate a method for producing a force sensor according to an embodiment of the present invention, in which FIG. 4A is a schematic diagram showing formation of a glass film, and FIG. 4B is a cross-sectional view showing anodic bonding.

The production process of the force sensor 1 includes a step of producing the force sensor chip 2, a step of producing the attenuator 3, and a step of anodic bonding the force sensor chip 2 and the attenuator 3.

The step of producing the force sensor chip 2 includes: a step of forming an active layer on a semiconductor substrate (wafer) and disposing resistive elements (strain resistive elements S, temperature compensating resistive elements 24 and the like) (see FIG. 3); a step of forming contact holes (not shown); a step of forming the various wirings 28, the electrode pads 25,26 (see FIG. 3) and through-holes A-D, K-N (see FIG. 5); and a step of separating semiconductor chips from a wafer.

In the step of disposing resistive elements on the semiconductor substrate, the strain resistive elements S, the temperature compensating resistive elements 24, and resistive elements 24a for monitoring (see FIG. 3) are disposed at specific positions on the semiconductor substrate (wafer). For example, a semiconductor substrate made of n-type silicon (100) is covered with a resist pattern for forming resistive element, made as a mask by photolithography, and boron ion as p-type impurity is implanted.

Subsequently, the resist pattern is removed, and an oxide silicon film is deposited as an interlayer insulation film, by p-CVD (plasma-enhanced chemical vapor deposition). Then, the semiconductor substrate is heated to activate the implanted boron, to thereby form the active layer.

In the step of forming contact holes, a resist pattern for the contact holes is formed, and using the resist pattern as a mask, portions of an interlayer insulation film on contact hole forming portions are removed by BHF (buffered hydrofluoric acid). The resist pattern is removed, Al—Si (alloy of aluminum and silicon) is sputtered on a whole surface of the semiconductor substrate, and heat treatment is performed for forming ohmic contact, to thereby form a contact between electrodes and the semiconductor substrate, and a contact with the active layer.

In the step of forming the various wirings 28, the electrode pads 25,26 (see FIG. 3), and the through-holes A-D, K-N (see FIG. 5), a resist pattern for creating pads for GND wiring and electrode are formed, unnecessary metal portions are removed by wet etching, and an SiN film (silicon nitride film) as a passivation film is formed by p-CVD. Subsequently, a resist pattern is applied, portions exposed at openings of the resist pattern are removed by etching treatment of RIE (reactive ion etching), and the through-holes A-D, K-N are formed in the semiconductor substrate.

Afterwards, the wafer is separated from the force sensor chip 2 by dicing.

The step of producing the attenuator 3 includes, for example, formation of the attenuator 3 from a stainless steel material by machine processing or electric discharge machining, and formation of the glass film 10 on the lower faces of the fixing portion 32 and the transmission portion 31 by, for example, vapor-deposition technique.

In the vapor-deposition technique, for example as shown in FIG. 4A, a glass material G is heated to approximately a melting point with a heater T under reduced pressure to vaporize the glass material G, and the glass film 10 is condensed on the lower faces of the fixing portion 32 and the transmission portion 31.

Though in the present embodiment, the glass film 10 is formed by vapor-deposition technique, it may be formed by sputtering technique. In the case of the sputtering technique, for example, the glass film 10 is formed by: applying a voltage to low-pressure gas of $10\text{-}10^{-1}$ Pa to hurl ions in a plasma state onto a target (i.e., glass material) and allowing molecules and atoms to come off from the target to deposit on an area where the glass film 10 is intended to be formed. It should be noted that the material for the attenuator 3 is not limited to stainless steel material, and other metal materials, such as aluminum and carbon steel, can be also used.

In the step of anodic bonding the force sensor chip 2 and the attenuator 3, as shown in FIG. 4B, at the joint portion 11 between the transmission portion 31 and the force sensor chip 2 and at the joint portion 12 between the fixing portion 32 and the force sensor chip 2, a voltage is applied with a negative voltage on an attenuator 3 side, and a positive voltage on a force sensor chip 2 side, to thereby join the glass film 10 on the attenuator 3 and the force sensor chip 2 by anodic bonding.

Figure 13A:
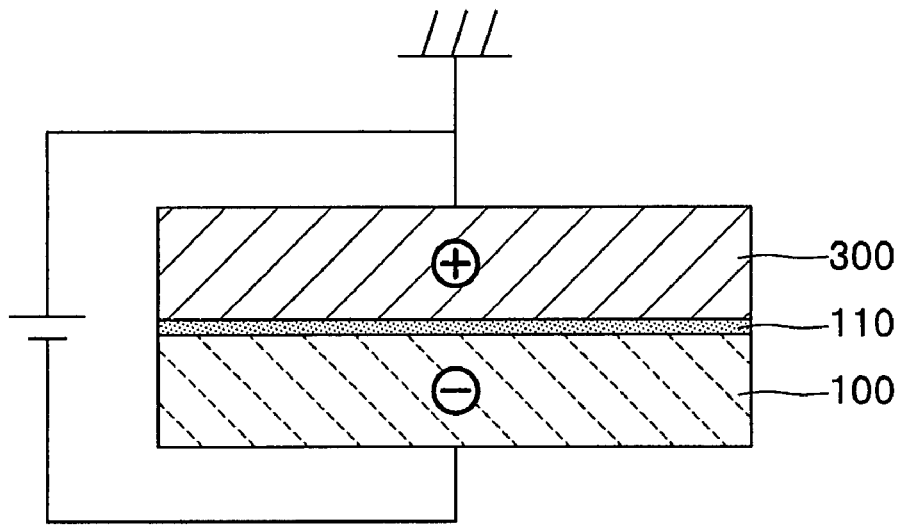
Figure 13B:
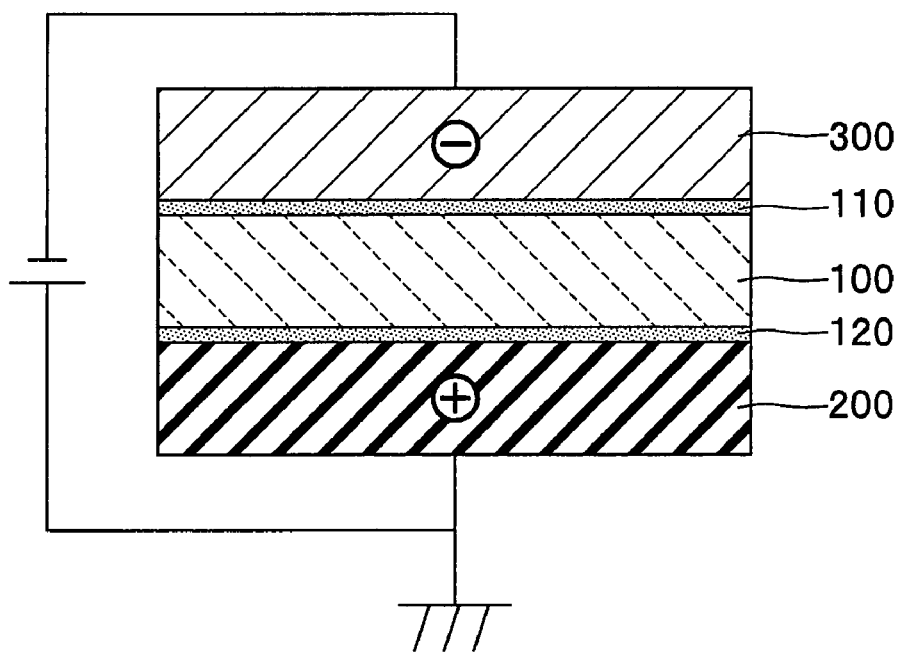

In the present embodiment, the glass film 10 (having a thickness of 0.05-20 μm) is formed on the attenuator 3 in advance not using a bulky glass plate but by vapor-deposition technique or sputtering technique, and with the glass film 10 sandwiched therebetween, the force sensor chip 2 is joined to the attenuator 3 by anodic bonding. Therefore, unlike the case of the conventional art explained with reference to FIGS. 13A and 13B, a reverse voltage is not applied to the joint portion between the attenuator and the glass during two joining processings. As a result, defects, such as detachment at a portion of the glass film 10, which may otherwise be caused by the application of a reverse voltage, can be prevented, and joint strength can be retained.

In addition, by forming the glass film 10 (having a thickness of 0.05-20 μm) by vapor-deposition technique or sputtering technique, the glass layer can be made much thinner than the bulky glass plate. Therefore, deflection of the glass layer due to external force can be reduced to a minimum, and an effect of the deflection of the glass layer can be skipped. As a result, without paying any attention to deflection of the glass layer which may otherwise require intricate correction on an output of the force sensor chip, an accurate detection can be implemented with a relatively simple data processing without sacrificing a design flexibility of the force sensor.

From the viewpoint of insulation function and joining function of the glass film 10, the glass film 10 is desirably made thicker, while from the viewpoint of force sensor function and buffering function on a difference in coefficient of thermal expansion, the glass film 10 is desirably made thinner. Therefore, taking various measurement data into account, an appropriate thickness of the glass film 10 was determined as 0.05-20 μm, so as to realize various functions at the same time, including insulation function, firm joint function, force sensor function and buffering function on a difference in thermal expansion.

Moreover, since there is no need to prepare a bulky glass and to perform machine processing, such as carving processing, the number of parts can be reduced which in turn reduces the cost, and microcracks can be prevented, which improves load-carrying capacity and reliability.

Figure 5:
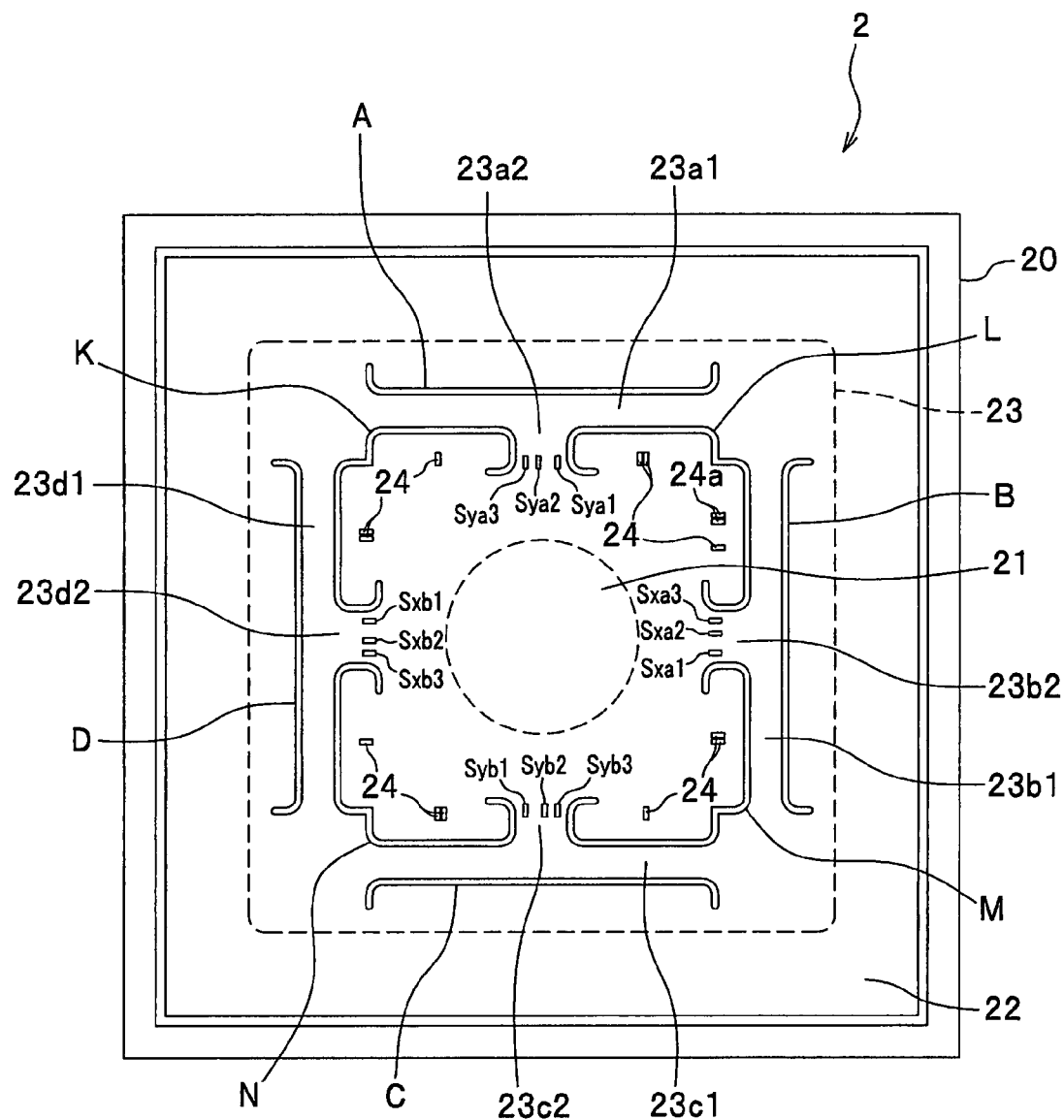
FIG. 5 is a plan view explaining details of a main part of a force sensor chip according to an embodiment of the present invention.

Next, the detailed configuration of the force sensor chip 2 will be explained with reference to FIG. 5. FIG. 5 is a plan view explaining details of a main part of a force sensor chip according to an embodiment of the present invention.

Figure 1B:
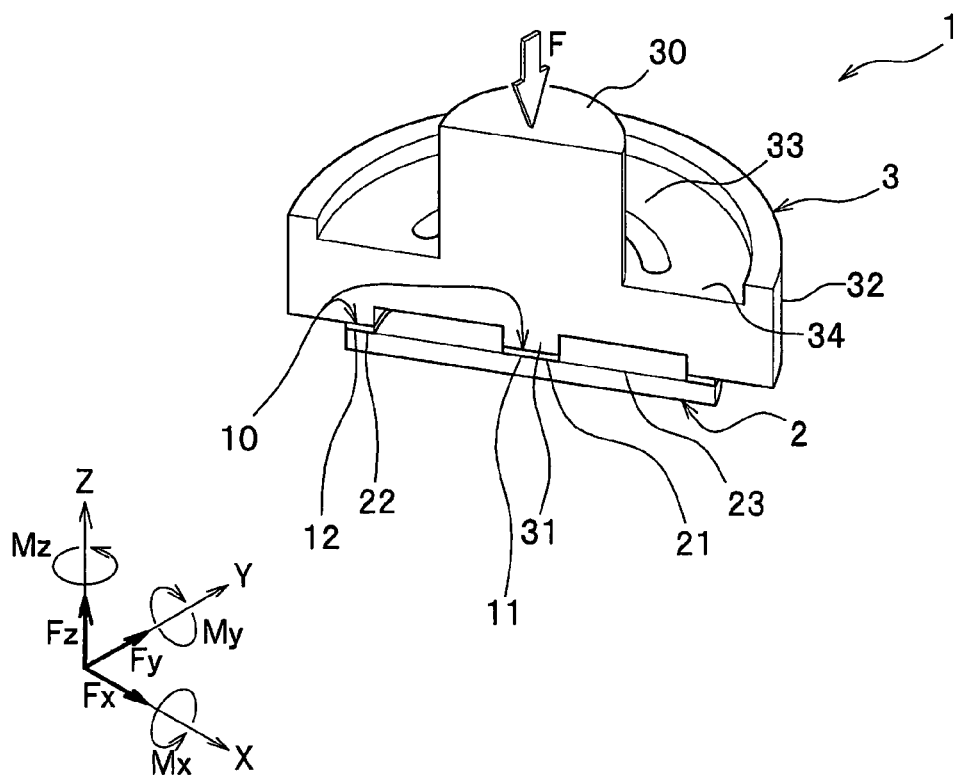

In the force sensor chip 2, the action portion 21 is disposed at a center, and the transmission portion 31 of the attenuator 3 is joined to the action portion 21 with the glass film 10 sandwiched therebetween (also see FIG. 1B).

As shown in FIG. 5, the connecting portion 23 is a region for connecting the action portion 21 and the support portion 22. At specific positions therein, the through-holes A-D, K-N each in a shape of a long and narrow slit are formed. The connecting portion 23 has beam-like elastic portions 23a1, 23b1, 23c1, 23d1 each having two ends connected to the support portion 22, and bridge portions 23a2, 23b2, 23c2, 23d2 contiguously formed with the respective elastic portions 23a1, 23b1, 23c1, 23d1 at center portions thereof, so as to form T-shape. On the bridge portions 23a2, 23b2, 23c2, 23d2, the strain resistive elements S (Sxa1-Sxa3, Sxb1-Sxb3, Sya1-Sya3, Syb1-Syb3) are disposed. At specific positions relative to the strain resistive elements S and the through-holes A-D, K-N, there are provided the temperature compensating resistive elements 24 for correcting strain of the strain resistive elements S, and the resistive elements 24a for monitoring whether or not the temperature compensating resistive elements 24 are properly functioning.

The support portion 22 forms a periphery of the force sensor chip 2 and is disposed outside the linear through-holes A-D formed in the connecting portion 23. The whole or a part of the support portion 22 is joined to the fixing portion 32 of the attenuator 3 with the glass film 10 sandwiched therebetween (see FIG. 1B).

As shown in FIG. 5, the strain resistive element S is a rectangular active layer (diffuse layer) formed on a surface (upper layer) of a semiconductor substrate 20, in such a manner that, when the external force is applied in a longitudinal direction of the strain resistive element S, and the strain resistive element S is deformed (not shown), resistance thereof changes.

Three strain resistive elements S forms one group and four groups are disposed on their respective bridge portions 23a2, 23b2, 23c2, 23d2 which are equally distant from the action portion 21. Specifically, on the bridge portions 23b2, 23d2 in the X-axis direction, a group of strain resistive elements Sxa1-Sxa3 and a group of strain resistive elements Sxb1-Sxb3 are symmetrically arranged with the action portion 21 as a symmetry center. In addition, on the bridge portions 23a2, 23c2 in the Y-axis direction, a group of strain resistive elements Sya1-Sya3 and a group of strain resistive elements Syb1-Syb3 are symmetrically arranged with the action portion 21 as a symmetry center.

The strain resistive elements Sxa1-Sxa3, Sxb1-Sxb3, Sya1-Sya3, Syb1-Syb3 are arranged so that the longitudinal direction of each of them aligns with a direction towards the action portion 21 (either X-axis direction or Y-axis direction).

The through-holes A-D, K-N include the through-holes A, B, C, D, each in a linear shape and the through-holes K, L, M, N each in a form of an L-shaped hook. Positions of the corners of the L-shaped through-holes K, L, M, N coincide with corners of a square, and the through-holes A-D, K-N are arranged to form an approximate square as a whole around the action portion 21.

Specifically, the through-hole K is formed between the strain resistive elements Sxb1-Sxb3 and the strain resistive elements Sya1-Sya3. The through-hole L is formed between the strain resistive elements Sya1-Sya3 and the strain resistive elements Sxa1-Sxa3. The through-hole M is formed between the strain resistive elements Sxa1-Sxa3 and the strain resistive elements Syb1-Syb3. The through-hole N is formed between the strain resistive elements Syb1-Syb3 and the strain resistive elements Sxb1-Sxb3. On the other hand, the linear through-holes A, B, C, D are formed outside the through-holes K, L, M, N. With these through-holes A-D, K-N, a strain in accordance with the applied external force F (see FIG. 1A) is intensively appeared at the portions where the strain resistive elements S are disposed, while the strain is not generated at the portions where the temperature compensating resistive elements 24, 24a are disposed.

With this configuration of the through-holes A-D, K-N, the rims of the connecting portion 23 facing the through-holes A-D, K-N are freely movable without suffering a stress, and therefore, even when the external force F (see FIG. 1A) is applied to the action portion 21, a tensile force and a compressive force by the external force F do not act on these free ends.

On the other hand, on the bridge portions 23a2-23d2, especially at a position where the strain resistive elements S are disposed, and on the connect portions of the support portion 22 with the elastic portions 23a1-23d1, a tensile force and a compressive force act in specific directions.

In the present embodiment, the linear through-holes A-D and the hook-shaped through-holes K-N are arranged in a shape of an approximate square, and the strain resistive elements S and the temperature compensating resistive elements 24, 24a are disposed while the strain distribution generated by the through-holes A-D, K-N are taken into account. However, the present invention is not limited to the present embodiment, and the through-holes A-D, K-N may be arranged, for example, in a form of a circle or the like, while the axial force (axial component) and the moment to be detected are taken into account.

The temperature compensating resistive element 24 is the same resistive element as the strain resistive element S, and twelve temperature compensating resistive elements 24 are disposed at specific positions on the semiconductor substrate 20 corresponding to twelve strain resistive elements Sxa1-Sxa3, Sxb1-Sxb3, Sya1-Sya3, Syb1-Syb3.

The temperature compensating resistive element 24 is disposed at a position where the temperature condition is the same as the strain resistive element S which is a subject of temperature compensation, and where no strain by the applied external force F acts on. In other words, the temperature compensating resistive elements 24 are disposed in the vicinity of their respective strain resistive elements S, and in the vicinity of an inner rim of the respective free ends facing the through-holes K, L, M, N.

Since the temperature compensating resistive elements 24 are disposed at positions on the force sensor chip 2 where the resistance value changes only by temperature conditions, a resistance value under no influence of ambient temperature can be obtained by eliminating a change in the resistance value due to a temperature change from a change in the resistance value of the strain resistive element S.

Specifically stated, a bridged circuit is composed of the temperature compensating resistive element 24 and the strain resistive element S, and by comparing the change in the resistance value due to the temperature change of the strain resistive element S and the external force F (FIG. 1A), with the change in the resistance value of the temperature compensating resistive element 24, exclusively the change in the resistance value by the external force F in the strain resistive element S is taken out and detected.

It should be noted that the resistive elements 24a (strain resistive element) for monitoring are disposed in such a manner that a Zero output state in which no stress is generated can be confirmed at all times.

Figure 6A:
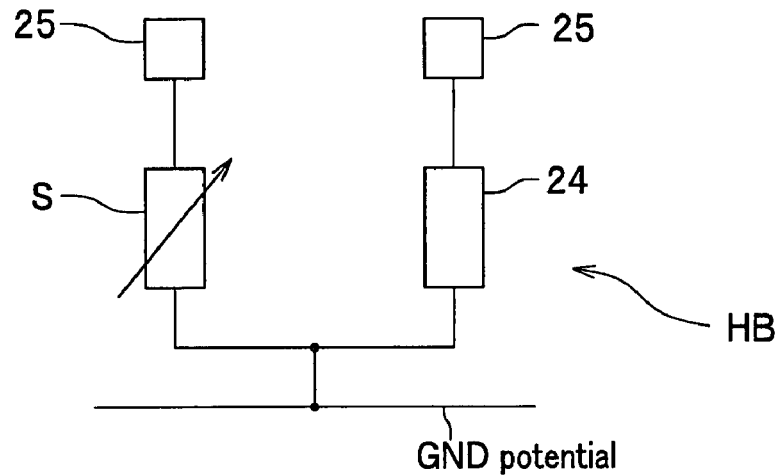
FIG. 6A is an electric circuit diagram showing a half-bridged circuit for illustrating a relation of electrical connection between a strain resistive element and a temperature compensating resistive element in the force sensor chip according to the present invention.
Figure 6B:
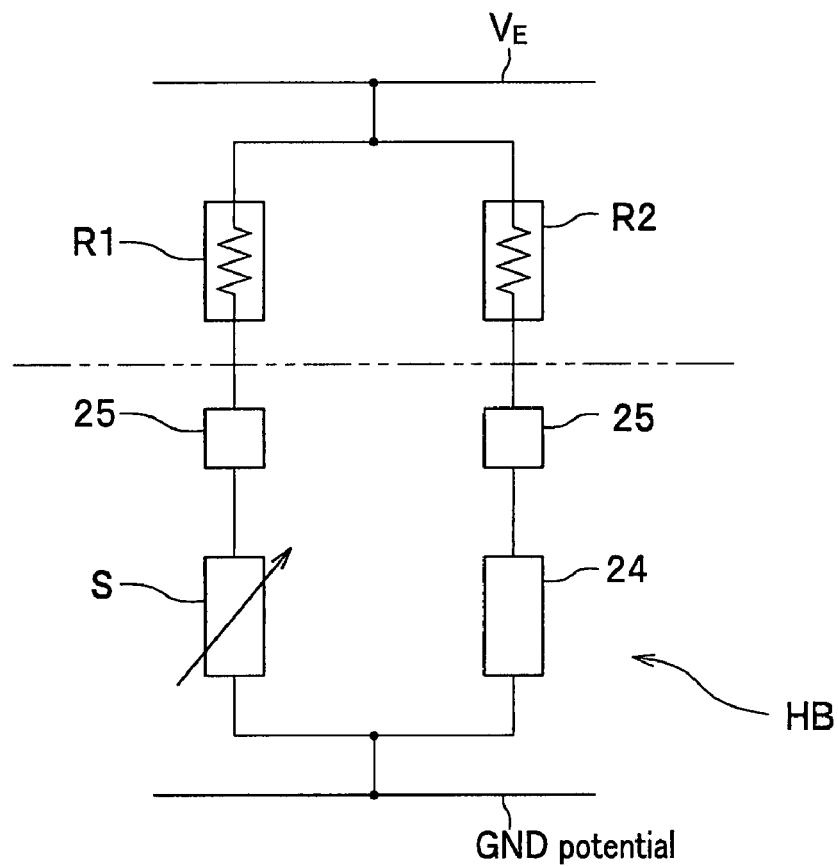
FIG. 6B is an electric circuit diagram showing a full-bridged circuit in which external resistances are added to the force sensor chip according to the present invention.

Herein, a relation of electrical connection between the strain resistive element S and the corresponding temperature compensating resistive element 24 will be described with reference to FIGS. 6A and 6B. FIG. 6A is an electric circuit diagram showing a half-bridged circuit for illustrating a relation of electrical connection between a strain resistive element and a temperature compensating resistive element in the force sensor chip according to the present invention, and FIG. 6B is an electric circuit diagram showing a full-bridged circuit in which external resistances are added to the force sensor chip according to the present invention.

In general, a full-bridged circuit is formed in the force sensor chip. However, it is also possible to have a half-bridged circuit and an external resistance added thereto to constitute a full-bridged circuit as a whole. The present embodiment adopts the latter configuration.

The strain resistive element S in the force sensor chip 2 according to the present invention (see FIG. 3) and the temperature compensating resistive element 24 for temperature compensation in accordance with the strain resistive element S forms a half-bridged circuit HB that corresponds to a lower half of the bridged circuit, as shown in FIG. 6A.

Specifically, in the half-bridged circuit HB, one end of the strain resistive element S and one end of the temperature compensating resistive element 24 (lower ends in the drawing) are connected to each other, which are then connected to a GND potential through the GND electrode pad (see FIG. 3). The other end of the strain resistive element S and the other end of the temperature compensating resistive element 24 (upper ends in the drawing) are connected to their respective signal electrode pads 25, 25.

An upper half of the bridged circuit is provided to the half-bridged circuit HB to form a full-bridged circuit, to thereby take out a resistance value from which an effect of the temperature change in the strain resistive element S is eliminated.

Specifically, in the full-bridged circuit as shown in FIG. 6B, the signal electrode pads 25, 25, to which the end (upper end in the drawing) of the strain resistive element S and the end (upper end in the drawing) of the temperature compensating resistive element 24 are connected, are connected to their respective ends of the external resistances R1, R2. The other ends of the external resistances R1, R2 are connected to each other, which are then connected to a supply voltage $V_E$.

With this configuration of the full-bridged circuit, and by detecting an output signal between the signal electrode pad 25 on a strain resistive element S side and the signal electrode pad 25 on a temperature compensating resistive element 24 side, a change in the resistance value due to the temperature change is eliminated from a change in the resistance value of the strain resistive element S to thereby exclusively take out and detect a change in the resistance value by the external force F (see FIG. 1A) on the strain resistive element S.

Next, an action of the force sensor 1 according to an embodiment of the present invention will be described.

When the external force F containing various axial components is input to the force sensor 1 according to an embodiment of the present invention, the external force F is attenuated by a predetermined ratio and the attenuated force is transmitted to the force sensor chip 2. An action of the attenuator 3 to which the external force F with various axial components is input will be described with reference to FIGS. 7A-7D. FIGS. 7A-7D show perspective views of action of the attenuator when an external force is applied.

Figure 7A:
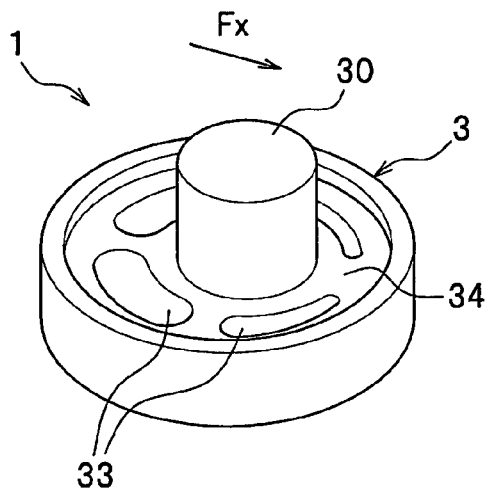
FIGS. 7A-7D show perspective views of action of the attenuator when an external force is applied.
Figure 7B:
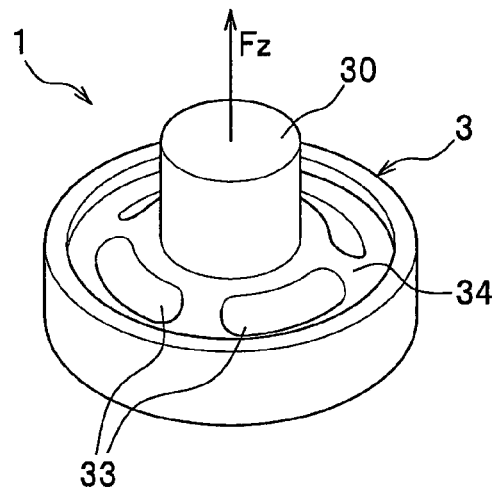
Figure 7C:
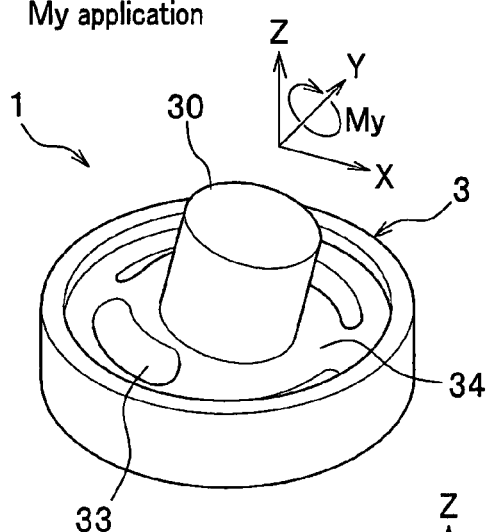
Figure 7D:
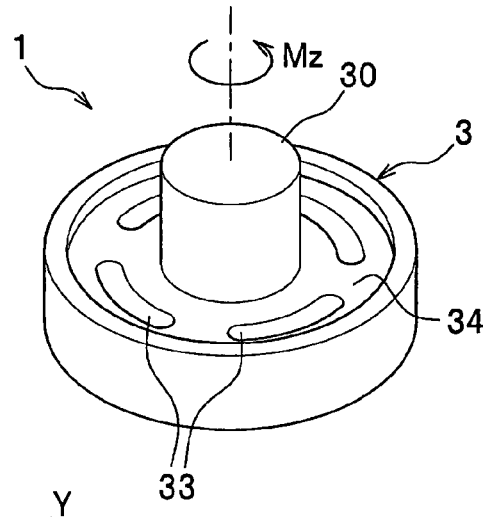
Figure 7D:
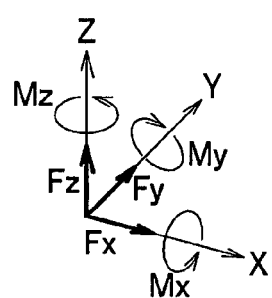

For example, as shown in FIG. 7A, when an external force Fx in the X-axis direction is input to the input portion 30, the input portion 30 slightly shifts in the X-axis direction. Likewise, when an external force Fz in the Z-axis direction is input, as shown in FIG. 7B, the input portion 30 slightly shifts in the Z-axis direction. Then, when a moment My about the Y-axis is input, the input portion 30 rotates about the Y-axis, and when a moment Mz about the Z-axis is input, the input portion 30 rotates about the Z-axis. The same is applied to the other axial components, and thus a duplicate description is omitted.

A state of strain in the force sensor chip 2 generated when the external force F (Fx, Fz, My, Mz) is applied will be described with reference to FIGS. 8-11.

Figure 8A:
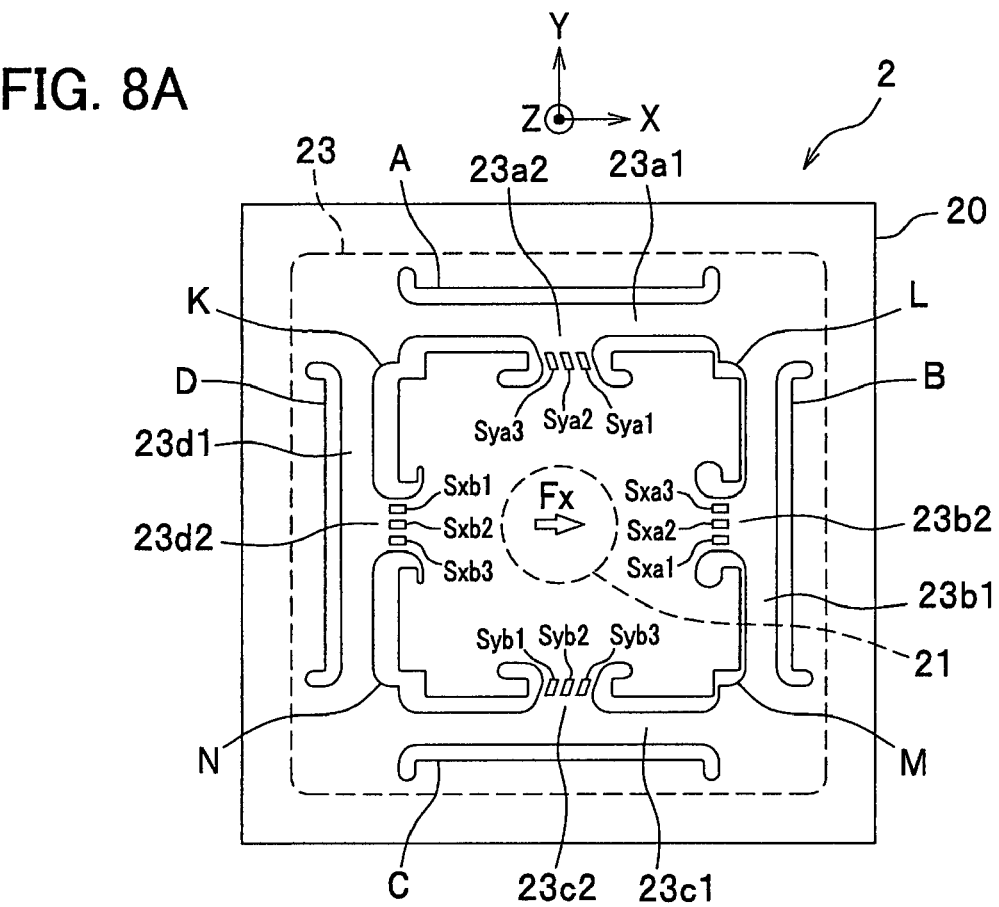
Figure 8B:
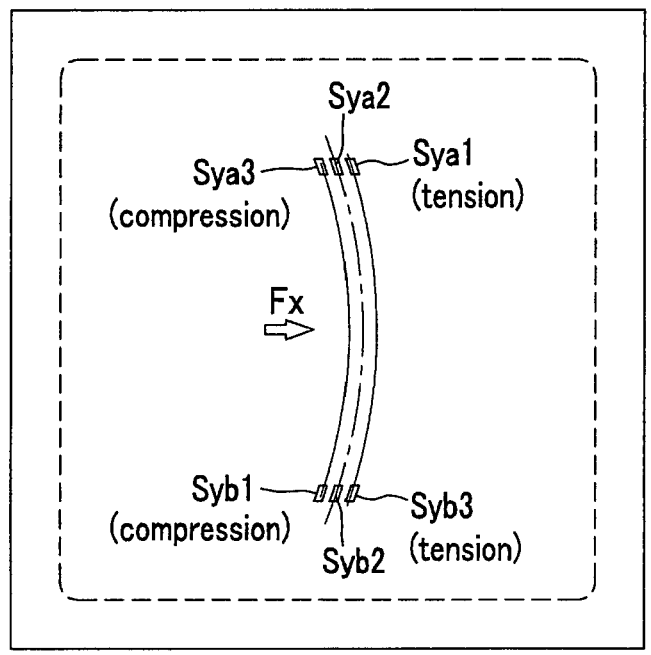

FIGS. 8A and 8B explain a deformed state of strain resistive elements when an external force Fx is transmitted to the action portion, in which FIG. 8A is a plan view, and FIG. 8B is a plan view showing a deformed state of the strain resistive elements.

As shown in FIG. 8A, with the application of the external force Fx, the action portion 21 tends to move in the X-axis direction. Consequently, notable deflections are generated in the bridge portions 23a2, 23c2. Under this condition, as shown in FIG. 8B, a tensile force acts on the strain resistive elements Sya1, Syb3 on an outer side of the deflection, leading to an increased resistance value. On the other hand, a compressive force acts on the strain resistive elements Sya3, Syb1 on an inner side of the deflection, leading to a reduced resistance value. The strain resistive elements Sxa1-Sxa3, Sxb1-Sxb3 are not affected by the external force Fx.

Figure 9A:
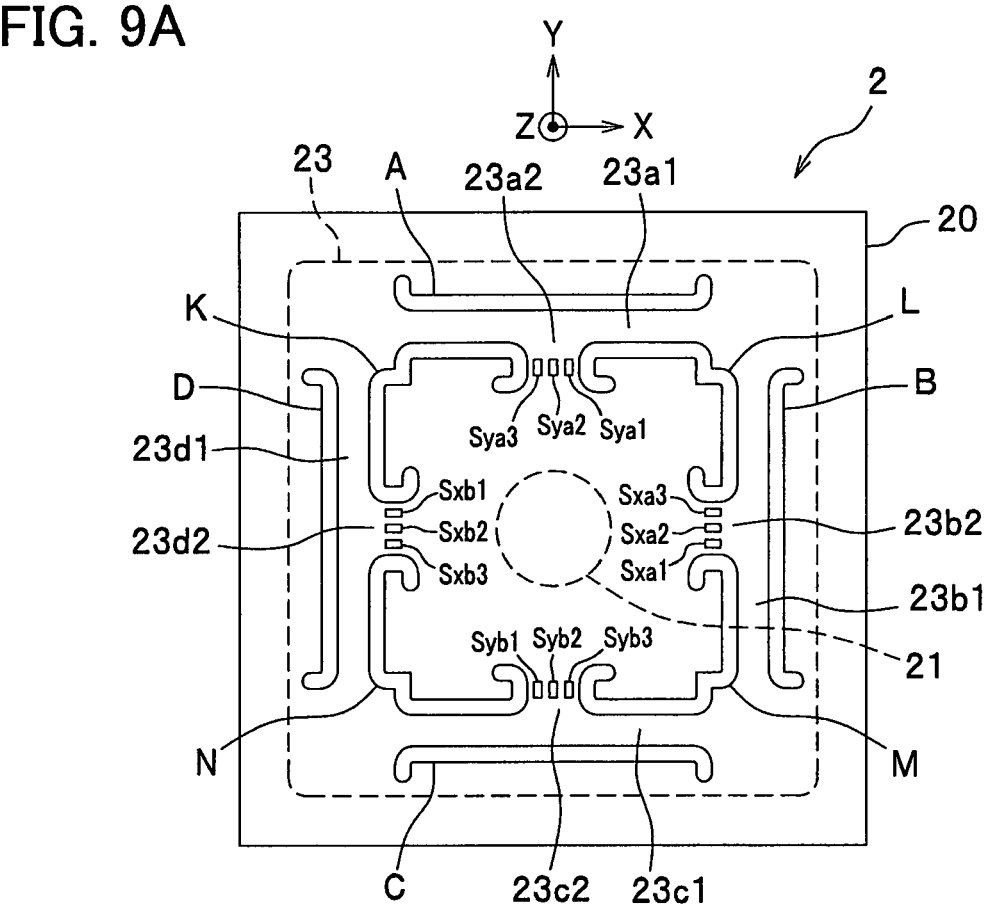
Figure 9B:
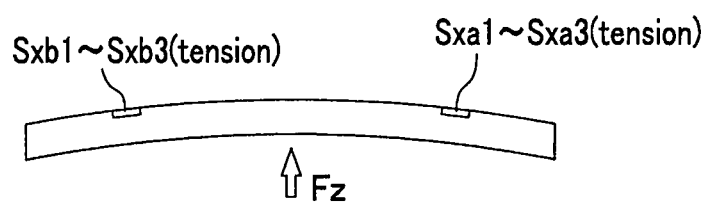

FIGS. 9A and 9B explain a deformed state of strain resistive elements when an external force Fz is transmitted to the action portion, in which FIG. 9A is a plan view, and FIG. 9B is a cross-sectional view showing a deformed state of the strain resistive elements.

As shown in FIG. 9B, with the application of the external force Fz, the action portion 21 tends to move in the Z-axis direction. Consequently, notable deflections are generated in the bridge portions 23a2, 23b2, 23c2, 23d2. Under this condition, a tensile force acts on all of the strain resistive elements Sxa1-Sxa3, Sxb1-Sxb3, Sya1-Sya3, Syb1-Syb3, leading to an increased resistance value, since all of the strain resistive elements Sxa1-Sxa3, Sxb1-Sxb3, Sya1-Sya3, Syb1-Syb3 are disposed on the surface (upper layer) of the semiconductor substrate 20.

Figure 10A:
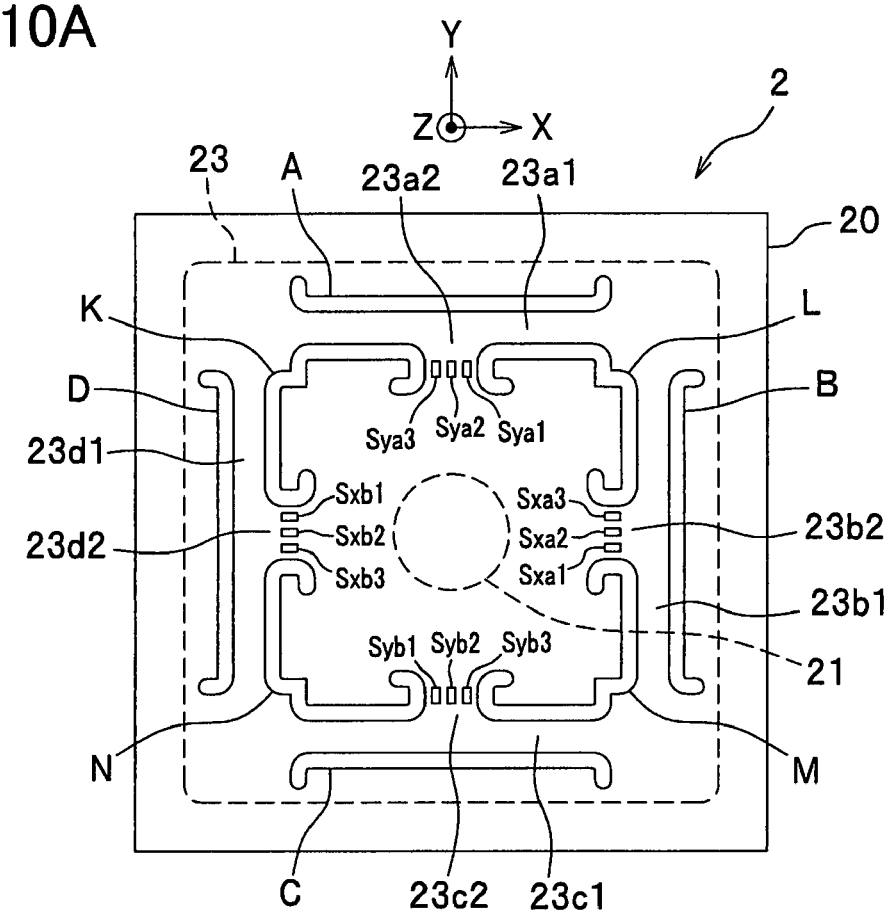
Figure 10B:

FIGS. 10A and 10B explain a deformed state of strain resistive elements when a moment My is transmitted to the action portion, in which FIG. 10A is a plan view, and FIG. 10B is a cross-sectional view showing a deformed state of the strain resistive elements.

As shown in FIG. 10B, with the application of the moment My, each of the bridge portions 23b2, 23d2 has a deflection in the X-axis direction, and a compressive force acts on the strain resistive elements Sxa1-Sxa3, leading to a reduced resistance value. On the other hand, a tensile force acts on the strain resistive elements Sxb1-Sxb3, leading to an increased resistance value. Neither the tensile force nor the compressive force acts on the bridge portions 23a2, 23c2 in the Y-axis direction, leading to no change in a resistance value.

Figure 11A:
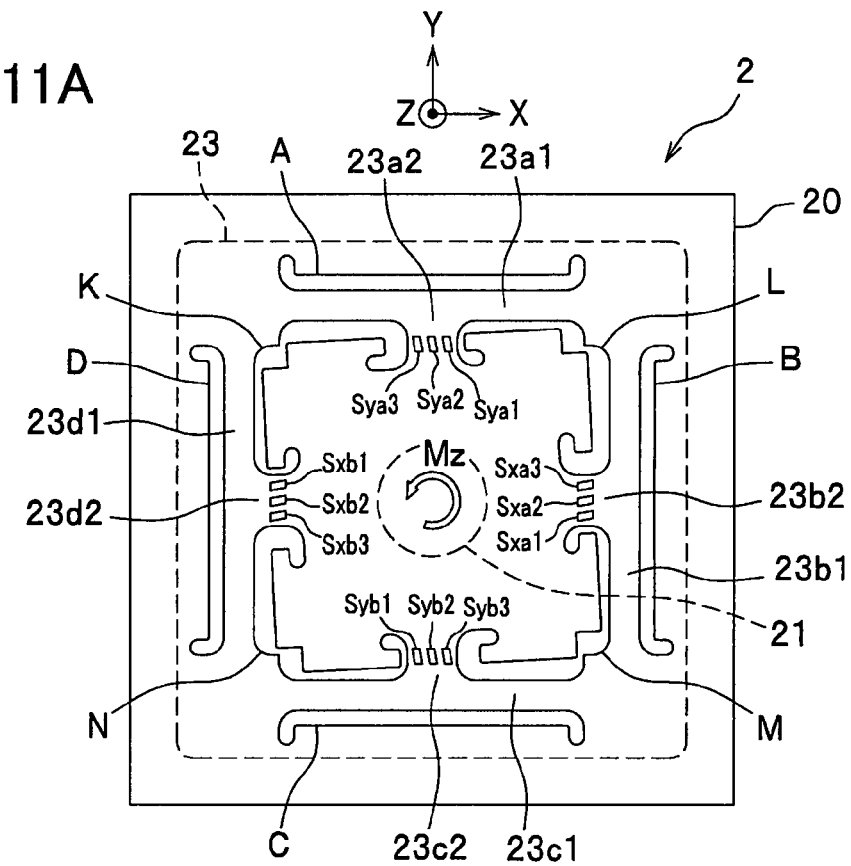
Figure 11B:
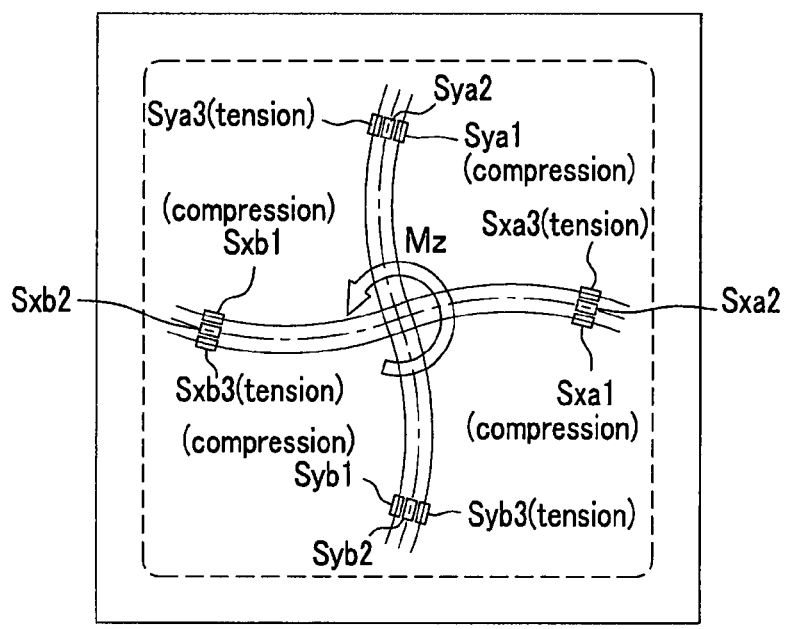

FIGS. 11A and 11B explain a deformed state of strain resistive elements when an external force Mz is transmitted to the action portion, in which FIG. 11A is a plan view, and FIG. 11B is a plan view showing a deformed state of the strain resistive elements.

As shown in FIG. 11B, with the application of the moment Mz, each of the bridge portions 23a2, 23b2, 23c2, 23d2 has a deflection, and a tensile force acts on each of the strain resistive elements Sya3, Sxa3, Syb3, Sxb3 on an outer side of the deflection, leading to an increased resistance value. On the other hand, a compressive force acts on the strain resistive elements Sya1, Sxa1, Syb1, Sxb1 on an inner side of the deflection, leading to a reduced resistance value. Neither the tensile force nor the compressive force acts on the strain resistive elements Sxa2, Sxb2, Sya2, Syb2 locating at the center of the deflection, leading to no change in the resistance value.

Relationships between the components (force and moment) of the external force F and the forces act on the strain resistive element S have been schematically described with reference to the four representative axial forces. When a compressive force or a tensile force acts on the strain resistive element S, the resistance value either increases or decreases, and a rate of the change in the resistance value (resistance change rate) is detected by the bridged circuit (FIGS. 6A and 6B).

Based on the resistance change rate, signals ultimately output from the hexaxial force sensor 1 are computed as resistance change rates Sig1-Sig6, corresponding to respective components (Fx, Fy, Fz, Mx, My, Mz).

In other words, the computed resistance change rates Sig1-Sig6 can be defined as follows from the resistance change rate so as to correspond to the respective components (Fx, Fy, Fz, Mx, My, Mz) included in the external force, after eliminating interference by other axial components as much as possible.

$$Sig1=((R'Sya1-R'Sya3)+(R'Syb3-R'Syb1))/4$$

$$Sig2=((R'Sxa3-R'Sxa1)+(R'Sxb1-R'Sxb3))/4$$

$$Sig3=(R'Sxa2+R'Sya2+R'Sxb2+R'Sy2)/4$$

$$Sig4=(R'Sya2-R'Syb2)/2$$

$$Sig5=(R'Sxb2-R'Sxa2)/2$$

$$Sig6=((R'Sxa3-R'Sxa1)+(R'Sya3-R'Sya1)+(R'Sxb3-R'Sxb1)+(R'Syb3-R'Syb1))/8$$

Herein, the resistance change rate is represented as, for example, "R'Sya1", which indicates a resistance change rate in Sya1. It should be noted that R'Sxa1, R'Sxa2, R'Sxa3, R'Sxb1, R'Sxb2, R'Sxb3, R'Sya1, R'Sya2, R'Sya3, R'Syb1, R'Syb2 and R'Syb3 indicate change rates after temperature compensation of the respective strain resistive elements.

Relationships between the hexaxial components (Fx, Fy, Fz, Mx, My, Mz) and the computed resistance change rates Sig1-Sig6 will be described. In order to calculate the components of the applied external force F based on the computed resistance change rates Sig1-Sig6, which are output signals of the force sensor 1, an axial force of a single component is preliminarily applied to the force sensor chip 2 and the output signal Sig1-Sig6 are calculated in advance. Based on the obtained values, the relationships between the hexaxial components (Fx, Fy, Fz, Mx, My, Mz) and the computed resistance change rates Sig1-Sig6 can be acquired.

Specifically, for example, when one applies the axial force Fx to the force sensor chip 2, the moment My is also applied in practice. However, the configuration of the force sensor chip 2 and the arrangement of the strain resistive element S and the like are designed as four-fold symmetry, and thus interference by other axial components can be eliminated as much as possible. As a result, Sig1 can be represented as a primary expression of Fx and My. Likewise, when the external force Fy is applied to the force sensor chip 2, Sig2 can be represented as a primary expression of Fy and Mx. Sig3 can be largely represented as a primary expression of Fz (other axial components can be suppressed to a negligible extent).

The same applies to the axial moment, and when the moment Mx is applied to the force sensor chip 2, Sig4 can be represented as a primary expression of Mx and Fy. When the moment My is applied to the force sensor chip 2, Sig5 is represented as a primary expression of My and Fx. Sig6 can be represented as a primary expression of Mz (other axial components can be suppressed to a negligible extent).

For the detailed description regarding this matter, a reference can be made to Japanese unexamined patent publication No. 2003-207405 (FIG. 13), which is a pending application by the same applicant.

With the preliminary tests described above, the computed resistance change rates Sig1-Sig6 can be represented by respective primary expressions of hexaxial components (Fx, Fy, Fz, Mx, My, Mz), while eliminating interference by other axial components as much as possible. From the primary expressions (determinants), an invert matrix can be obtained and thus the hexaxial components (Fx, Fy, Fz, Mx, My, Mz) can be represented by the primary expressions of the computed resistance change rates Sig1-Sig6. In this manner, the hexaxial components (Fx, Fy, Fz, Mx, My, Mz) can be obtained from the computed resistance change rates Sig1-Sig6 (see Japanese unexamined patent publication No. 2003-207405, paragraph [0070] for details).

Figure 12:
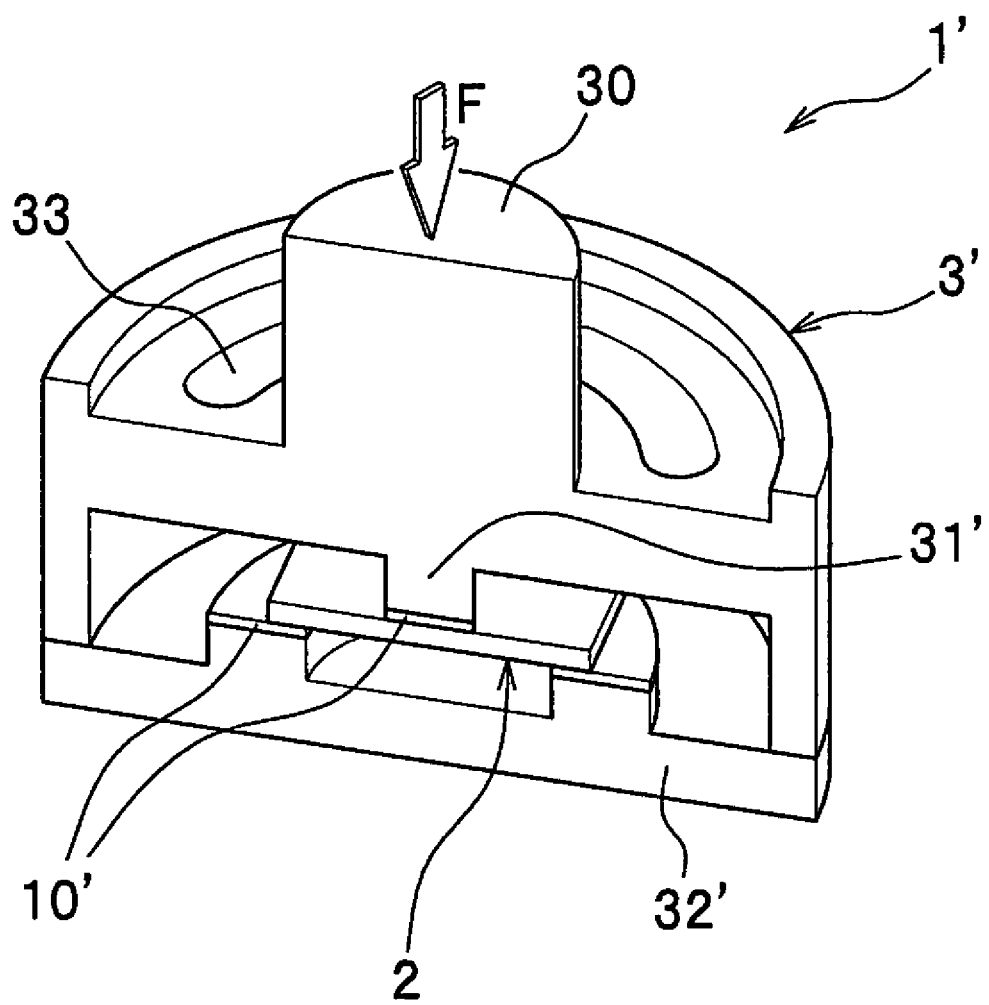
FIG. 12 is a cross-sectional perspective view for explaining a force sensor according to another embodiment of the present invention.

Next, a force sensor 1' according to another embodiment of the present invention will be described with reference to FIG. 12. FIG. 12 is a cross-sectional perspective view for explaining a force sensor according to another embodiment of the present invention.

In the following description, components which are the same as those illustrated in the force sensor 1 according to the embodiment described above are designated with the same reference characters, and thus a duplicate description is omitted.

The force sensor 1' according to the present embodiment is different from the force sensor 1 according to the embodiment described above, in the configuration of an attenuator 3'. Specifically stated, in the force sensor 1 of the embodiment described above, the transmission portion 31 and the fixing portion 32 are present on the same side of the force sensor chip 2; while in the force sensor 1' according to the present embodiment, a fixing portion 32' for fixing the force sensor chip 2 is joined to a lower face of the force sensor chip 2 in the drawing and a transmission portion 31' is joined to an upper face of the force sensor chip 2.

The configuration of holding the force sensor chip 2 by the attenuator 3 may vary as described above, and other modifications can be also applied to the present invention.

The embodiments of the present invention have been described above. However, the present invention is not limited to the above embodiments, and it is a matter of course that the above embodiments may be properly modified.

For example, in the embodiment above, the glass film 10 is formed by vapor-deposition technique or sputtering technique. However, the present invention is not limited to these techniques, and other film-forming techniques, such as ion plating (IP) technique and chemical vapor deposition (CVD), can be used. Though the technique for forming a glass film varies and continuously makes advance, the technique can be appropriately selected while sensitivity, endurance and other properties required for the force sensor, cost, amount of production and the like are taken into account.

In the present embodiment, the glass film 10 is formed on the attenuator 3, and the attenuator 3 and the force sensor chip 2 are joined with the glass film 10 sandwiched therebetween. However, the present invention is not limited to the present embodiment, and the glass film 10 may be formed on the force sensor chip 2 and the force sensor chip 2 and the attenuator 3 may be joined by anodic bonding through the glass film 10 sandwiched therebetween. In the production process of the force sensor chip 2, prior to separation of semiconductor chips from the wafer, a glass film may be formed at the joint portions 11, 12 of the wafer surface, and then the glass film on the force sensor chip 2 and the attenuator 3 are joined by anodic bonding after dicing.

Specifically, by applying a voltage to the subject with a negative voltage on a force sensor chip 2 side and a positive voltage on an attenuator 3 side, the glass film formed on the force sensor chip 2 and the attenuator 3 are joined by anodic bonding, Also in the case of the glass film formation on the force sensor chip 2 side, like in the formation of the glass film on the attenuator 3, a glass film can be appropriately formed by vapor-deposition technique, sputtering technique or other film-forming techniques.

In the embodiments above, in the force sensor chip 2, the action portion 21 is provided at the center, and the connecting portion 23 and the support portion 22 are formed on the outer side of the action portion 21. However, the present invention is not limited to this configuration, and the support portion 22 may be provided at the center, the connecting portion 23 may be provided on the outer side of the support portion 22, and then the action portion 21 may be provided on the further outer side of the connecting portion 23. In short, any configuration can be adopted to the force sensor chip 2, as long as the strain resistive element S disposed on the connecting portion 23 which is adjacent to the action portion 21 can detect the external force F transmitted to the action portion 21, and the support portion 22 can support the connecting portion 23 and the action portion 21.

Moreover, in the embodiments above, the force sensor chip 2 is in a shape of an approximate square. However, the present invention is not limited to this shape, and the force sensor chip 2 may be in a rectangular shape, a circle or the like. In addition, the attenuator 3 may be in a form of a cube, a rectangular parallelepiped or the like. To the present invention, various embodiments can be applied with respect to the shape of the force sensor chip 2, the shape of the attenuator 3, and the combinations thereof.

In the embodiments above, each of the number of the strain resistive elements S and the temperature compensating resistive elements 24 is set at 12, but the present invention is not limited to this number, and any number can be applied in accordance with a shape of the sensor chip 2 and the like. With respect to the positional arrangement of the strain resistive elements S and the temperature compensating resistive elements 24, any position different from the present embodiments can be applied.

What is claimed is:

1. A method for producing a force sensor comprising a force sensor chip with strain resistive elements for detecting a transmitted external force; and an attenuator for fixing the force sensor chip, attenuating the external force and transmitting the attenuated external force to the force sensor chip, in which the force sensor chip and the attenuator are joined at joint portions with a glass layer sandwiched therebetween, the method comprising:

forming a glass film as the glass layer between the attenuator and the force sensor chip at the joint portions; and
performing anodic bonding by stacking the force sensor chip including the glass film formed thereon and the attenuator as a stacked body in close contact with each other at the joint portions, and applying a voltage to the stacked body with a first voltage on a force sensor chip side and a second voltage on an attenuator side, to join the glass film and the attenuator,
wherein the force sensor chip comprises
an action portion to which the external force is transmitted,
a connecting portion which is adjacent to the action portion and on which the strain resistive elements are disposed at specific positions, and
a support portion for supporting the action portion and the connecting portion,
wherein the attenuator comprises
an input portion to which the external force is input,
a fixing portion for fixing the force sensor chip, and
a transmission portion for attenuating the external force and transmitting the attenuated external force to the action portion, and
the joint portions are provided at positions between the action portion and the transmission portion, and between the support portion and the fixing portion.

2. The method for producing a force sensor according to claim 1, wherein the first voltage comprises a negative voltage and the second voltage comprises a positive voltage.

3. The method for producing a force sensor according to claim 1, wherein the first voltage comprises a positive voltage and the second voltage comprises a negative voltage.

4. The method for producing a force sensor according to claim 1, wherein vapor deposition or sputtering is used in the film forming step.

5. The method for producing a force sensor according to claim 1, wherein a thickness of the glass film formed in the film forming step is in a range of 0.05-20 μm.

* * * * *